June 16, 1936.  H. J. GRIFFITH  2,044,681
TIRE SPREADING TOOL
Filed June 8, 1934   2 Sheets-Sheet 2
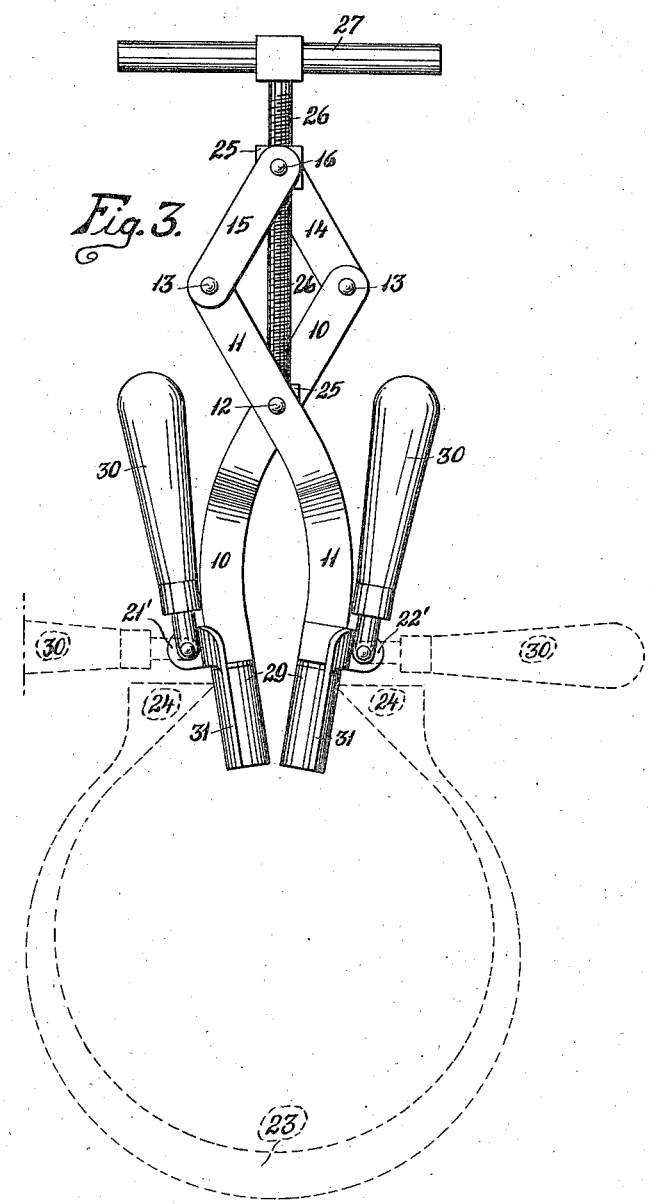
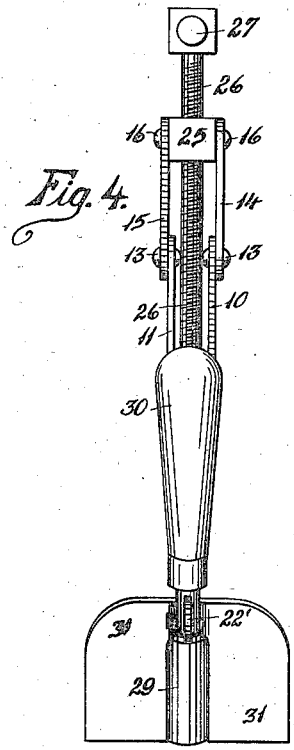
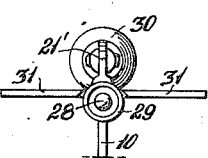
Inventor:
Harry J. Griffith.
By Thomas H. Sweet.
Attorney.

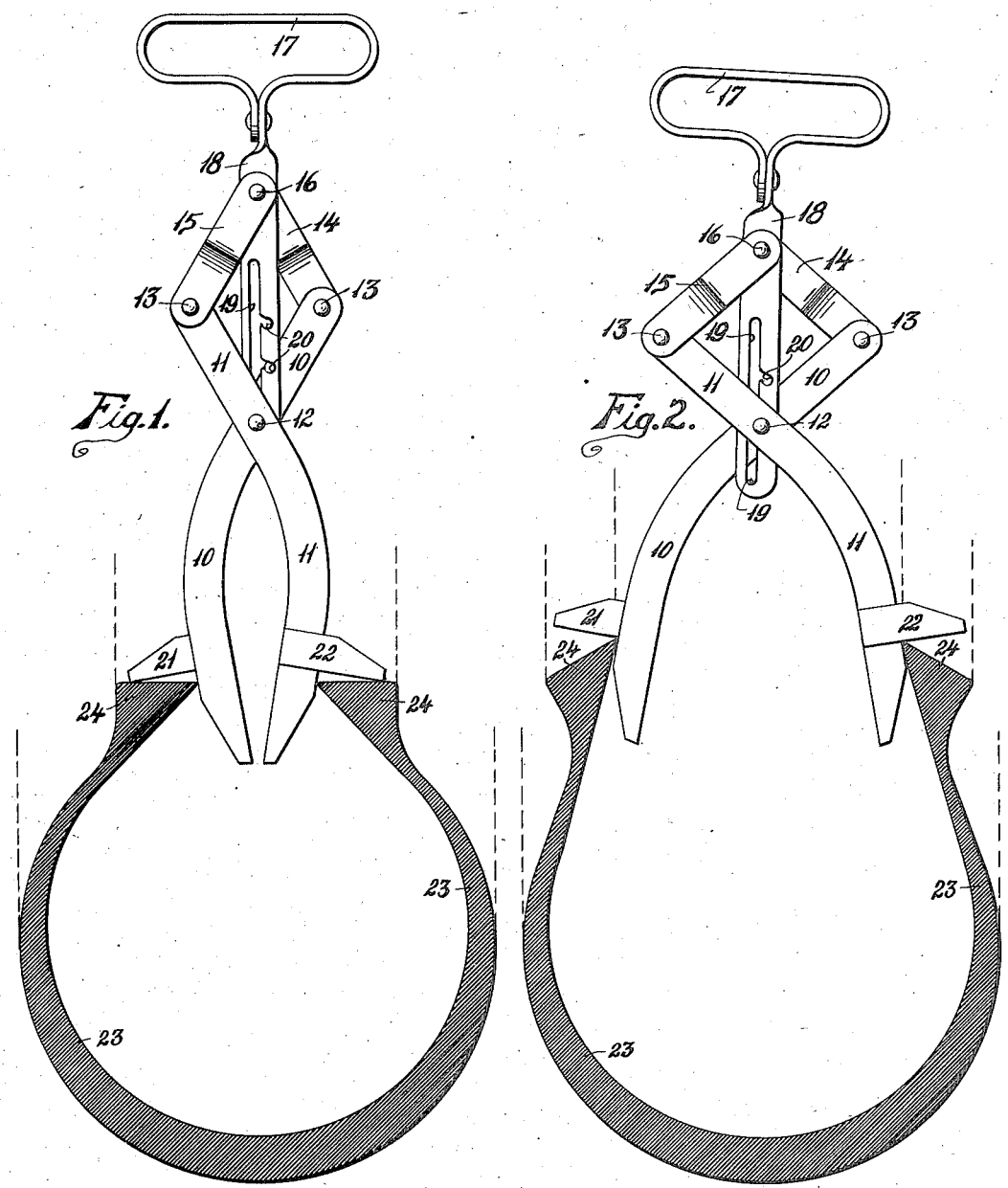

Patented June 16, 1936

2,044,681

UNITED STATES PATENT OFFICE 2,044,681

TIRE-SPREADING TOOL

Harry J. Griffith, Denver, Colo., assignor of one-twelfth to Edward Cone, one-twelfth to May Cone, and one-twelfth to Edna L. Cone, all of Denver, Colo.

Application June 8, 1934, Serial No. 729,658

4 Claims. (Cl. 152—27)

This invention relates to hand tools adapted to be employed for the spreading apart of the mounting rims or beads of pneumatic tire casings to facilitate inspection and repair of interior surfaces of such casings and to expedite proper insertion of inner tubes, fillers, and the like, relative to such casings, and has as an object to provide an improved hand tool for such purposes.

A further object of the invention is to provide an improved tire-spreading tool readily insertable between the normally-positioned beads of a pneumatic tire casing and manually-operable to effect relatively wide spacing of said tire beads through single-handed manipulation of said tool.
A further object of the invention is to provide an improved tire-spreading tool readily latchable in and releasable from tire-spreading position through single-handed manipulation of said tool.

A further object of the invention is to provide an improved tire-spreading tool readily shiftable, through single-handed manipulation, between various operative positions relative to a tire casing.

A further object of the invention is to provide an improved tire-spreading tool that is simple and inexpensive of manufacture, facile and efficient in operation, and durable in use.

My invention consists in the construction, arrangement and combination of elements hereinafter set forth, pointed out in my claims and illustrated by the accompanying drawings, in which—

Figure 1 is an elevation of a preferred embodiment of the invention in its initial operative relation with a pneumatic tire casing. Figure 2 is a view similar to Figure 1 illustrating the elements of said latter figure latched in an intermediate tire-spreading relationship. Figure 3 is an elevation of a modified construction of the improved tool, dotted lines indicating relative position of a tire casing to be acted upon and alternative positions of certain of the tool elements. Figure 4 is a side elevation of the tool construction according to Figure 3. Figure 5 is a bottom plan view of one of the tire-spreading arms illustrated in Figures 3 and 4.

In the inspection, manipulation and repair of pneumatic tire casings, access to the interior of such casings is frequently necessary and is, in fact, essential to a proper inspection of such casings, which access, because of the inherent stiffness in and close spacing between the mounting rims or beads of conventional tire casings, is normally virtually impossible without the use of special shop equipment or both hands of the operator, in which latter case it is extremely difficult to make any adjustments or repairs which may be indicated. Further, a suitable mount or support for the tire casing under inspection or repair is not usually available, and a spreading tool which may be efficiently operated by one hand of an operator while the tire is supported by the other hand is a time-saving facility having many practical advantages, the improved tool hereinafter described having been designed to overcome the disadvantages of tire repair and inspection hereabove set forth.

In the construction of the improved tool as illustrated in Figures 1 and 2, the numerals 10 and 11 designate identical, longitudinally-curved lever arms formed of suitable stiff material, such as metal, in any desired manner and arranged with their curves in opposition in overlapped relation, said arms 10 and 11 being so disposed as to overlap more nearly adjacent one end than the other so that the shorter ends thereof diverge beyond the common overlap and the longer ends thereof first diverge beyond the common overlap and then, by virtue of the longitudinal curvature of said arms, converge to closely spaced relation of their terminal portions, a suitable pin, rivet, or the like, 12, intersecting the overlapped portions of said lever arms 10 and 11 and pivotally interconnecting said arms. The shorter, diverging ends of the arms 10 and 11 are pivoted, as at 13, to the corresponding ends of identical links 14 and 15, respectively, which latter converge away from the pivot 12 to overlapped, pivotal interconnection of their other ends, as indicated at 16. The lengths of the links 14 and 15 between their pivotal points 13 and 16 are preferably substantially equal to the lengths of the arm portions 10 and 11 between the pivotal points 12 and 13, so that, when the elements are interconnected as above set forth, the link 14 is positioned substantially parallel with the shorter portion of the arm 11 and the link 15 is correspondingly substantially parallel with the shorter portion of the arm 10, thus providing a pantograph arrangement operable, when pressure is applied to the pivot 16 in the direction of the pivot 12, to increase the divergence between the shorter portions of the arms 10 and 11, with consequent spreading or separating effect on the longer portions of said arms. An operating handle 17, preferably of loop form, is formed on or rigidly secured to a flat shank 18, which latter is positioned between the overlapped ends of the links 14 and 15 and intersected by the pivot 16 interconnecting said links, the said shank 18 extending in bisecting relation with the angle between said links and being received between the overlapped portions of the arms 10 and 11 in position to be intersected by the pivot element 12. An elongated slot 19 is formed in embracing relation with the pivot element 12 longitudinaly of the shank 18, in which slot said pivot element is free to reciprocate as the distance between the pivots 12 and 16 is varied, and suitable notches 20, in such number as may be expedient, open from said slot 19 laterally of the shank 18 in spaced relation longitudinally of said shank and slot, said notches 20 having each a throat of a size to slip freely over the pivot element 12, at times, and thereby latch said pivot element against motion longitudinally of the shank 18 and in, consequently, a position determining a fixed spread relation of the free ends of the arms 10 and 11. The latching or unlatching relation of the notches 20 with the pivot element 12 is controlled by motion of the shank 18 about the pivot 16, which motion is imparted to said shank by suitable side pressure applied to the handle 17, as will be obvious, so that said latching and unlatching relation of the tool elements may be easily determined by the operator through the same hand and agency employed for spreading manipulation of the tool. The free ends of the arms 10 and 11 are preferably tapered or beveled, substantially as illustrated, to permit of ready and effective insertion of the arm ends to operative position between the beads or mounting rims of a tire casing. Spaced a relatively short distance longitudinally of the arms 10 and 11 from the free ends of said arms, identical stops or lugs, 21 and 22, are formed on or suitably secured to said arms 10 and 11, respectively, and extend laterally therefrom in opposite directions to engage against the tire beads as the tool is inserted therebetween and limit the extent of tool introduction within the tire casing.

In Figures 1 and 2, the above described embodiment of the improved tool is illustrated in operative relation with a pneumatic tire casing, the latter being shown as the conventionalized cross section of such a casing having the usual tread and body portion 23 in the customary relation with slightly spaced, parallel beads 24 between which the filler, tube, or similar agent, is inserted, Figure 1 illustrating the tool in its initial operative position relative to the tire casing, and Figure 2 showing the same tool and casing in one operated position of the former. In the operation of the improved tool as shown in said Figures 1 and 2, the tire casing is supported in substantially vertical position by any suitable means, usually one hand of the tool operator, and the handle 17 of the improved tool grasped by the other hand of the operator with the arms 10 and 11 in freely depending, closely adjacent relation. The operator then inserts the tapered free ends of the arms 10 and 11 between the beads 24 and applies downward pressure to the handle 17, such pressure first serving to push the tapered ends of the arms 10 and 11 downward between the beads 24 until the stops 21 and 22 engage against said beads, and thereafter acting to move the pivot 16 toward the pivot element 12, which motion, by virtue of the link arrangement hereabove described, spreads apart the free ends of the arms 10 and 11 to force relatively wide separation of the beads 24, as is illustrated by Figure 2. During the motion of the pivot 16 which brings about separation of the beads 24, the pivot element 12 slides freely longitudinally of the slot 19, a slight lateral shift of the operating pressure applied to the handle 17 being sufficient to bring the notched side of the slot 19 into bearing relation with the pivot element 12 and seat the latter in one of the notches 20 to latch the tool in the desired spread relation of the beads 24, edges of the arms 10 and 11 and of the stops 21 and 22 biting into corners of the tire beads 24 sufficiently to prevent accidental displacement of the tool while latched, after complete release of the tool by the operator. To unlatch, close and remove the tool from the tire casing involves only a reversal of the cycle above set forth. It should be immediately apparent that the tool provides convenient and efficient means for the rapid and thorough inspection of a casing interior, since the tool can be rapidly applied at frequent intervals about the circumference of the beads 24 and caused to spread such beads in a manner to successively open the entire casing interior to view. With the tool in latched spreading position, it may be released by the operator who then has both hands free for such repair or adjustment as may be required on the casing.

In the modification of the invention according to Figures 3, 4 and 5, the essential principle and operating elements are the same as previously described, certain refinements of construction having been introduced in the disclosure of the last cited figures to better adapt the tool to use with certain unusually stiff and heavy tire casings and to provide means whereby the tool may be moved, while in spreading relation with a casing, circumferentially of the latter. The modified construction of the tool comprises the arms 10 and 11, pivot element 12, pivots 13, links 14 and 15, and pivot 16, in the same operative relationship hereabove set forth. In the modification, however, the pivots 12 and 16 support suitable blocks 25 between the pivoted members interconnected thereby, the upper of said blocks, mounted on and forming a part of the pivot 16, being provided with an internally-threaded bore wherein is seated and operatively engaged a threaded stem 26, the lower end of which stem is fixed for rotation and against axial displacement in the lower of said blocks 25, which is carried by the pivot 12. The free end of the stem 26 projects above the upper block 25 and is provided with a suitable fixed handle 27, whereby rotation may be imparted to said stem to cause travel of the upper relative to the lower of the blocks 25 to cause separation or approachment of the free ends of the arms 10 and 11, according to the direction of rotation imparted to said stem. The screw arrangement for applying power to the tool exerts a relatively much stronger separatory force through the arms 10 and 11, hence may have advantage where heavy casings or those with very stiff beads are encountered, and the screw arrangement, also, is self-locking, consequently no provision need be made for latching the tool elements in any of the bead-separating positions.

The lower, free ends of the arms 10 and 11 shown in the modified construction according to Figures 3, 4 and 5 are formed as pintles or spindles, as indicated at 28, whereon are suitably mounted for rotation cylindrical roller members 29 adapted for insertion between and rolling contact with the adjacent edges of the tire beads 24, indicated by dotted lines in Figure 3. Immediately inward of the arms 10 and 11 relative to the said rollers 29, stops 21' and 22', similar to the stops 21 and 22 previously described, are suitably fixed to and extend laterally from the said arms 10 and 11, respectively, the lateral extent of said stops 21' and 22' beyond their respective arms being limited in comparison with that of the corresponding arms 21 and 22 and each providing a pivotal mounting for one end of an operating handle 30 suitably hinged to each of said stops, such mounting providing that the handles 30 may be folded into relatively compact position adjacent and in upwardly extending relation along said arms 10 and 11, as shown in full lines in Figures 3, 4 and 5, and swung into laterally extending relation with said arms at times, as indicated by the dotted lines in Figure 3, in which latter position said handles may be employed to move the spreader tool assembly, when in bead-separating position, circumferentially of the tire beads to such position or positions as may be desired, the rolling contact of the members 29 with the bead edges facilitating such variation of the tool position. To prevent twisting of the tool from its engaged position between the tire beads 24, suitable guide skirts or members 31 are secured to each of the elements 21' and 22' and depend from such elements on either side of and in substantially parallel relation with the axis of the rollers 29 to define relatively wide guide surfaces in substantially parallel relation each with their adjacent tire bead margins, which surfaces act to engage against such bead margins for limitation of tool twisting action therebetween.

The operation of the modified tool construction last above described is essentially similar to that described for the tool construction illustrated in Figures 1 and 2, the principal operative differences being in the method of applying the bead-separating force, a rotatively-applied screw action being employed to that end in the case of the modified construction as against a directly applied thrust in the case of the originally described arrangement, and in the use of the rollers 29 and handles 30 of the modified construction for the purpose of translating the tool assembly circumferentially of the tire beads without removal of the tool assembly from between said beads when in spread relation therewith, this latter attribute of the tool being important in the modified construction because of the length of time required, in a relative sense, for actuation of the arms 10 and 11 between their operative limits through manipulation of the screw 26.

It is of course obvious that the screw-type expanding arrangement of Figures 3 and 4 may be applied to the tool construction of Figures 1 and 2, and that in like manner the handles 30, rollers 29 and guides 31 of the former figures may be adapted to the construction of the latter figures, and that many other modificaions, variations and recombinations of the specific elements shown and described may be had, all without departing from the spirit of the invention, hence I wish to be understood as being limited solely by the scope of the appended claims, rather than by any details of the illustrative showing and foregoing description.

I claim as my invention—

1. A tool of the character described comprising crossed, pivotally-interconnected arm members, a separate arm-actuating member hingedly toggle-connected with spaced ends of said arm members, and means on said arm-actuating member slidingly engaging about the pivot interconnecting said arm members and operable to latch said arm members in various of their relative positions.

2. A tool of the character described comprising crossed, pivotally-interconnected arm members, manually-operable handle means hingedly toggle-connected with said arm members for variation in the relative positions of the latter, and means in fixed relation with said handle means slidingly engaging about the pivot interconnecting said arm members and operable to latch said arm members in various of their relative positions.

3. A tool of the character described comprising a pair of longitudinally-curved arm members pivotally-interconnected in crossed relation and arranged to converge on one side of and diverge on the other side of said pivotal interconnection, manually-operable handle means hingedly toggle-connected with the divergent end portions of said arm members for variation in the relative positions of the convergent portions of said members, and means in fixed relation with said handle means slidingly engaging about the pivot interconnecting said arm members and operable to latch the convergent portions of said arm members in various of their relative positions.

4. A tool of the character described comprising a pair of longitudinally-curved arm members pivotally-interconnected in crossed relation and arranged to converge on one side of and diverge on the other side of said pivotal interconnection, tapered portions on the convergent ends of said arm members to facilitate entrance of the latter between elements to be separated, stop means in fixed relation on and adjacent the convergent ends of said arm members arranged to engage against and limit penetration of said arm members between elements to be separated, manually-operable handle means hingedly toggle-connected with the divergent end portions of said arm members for variation in the relative positions of the convergent portions of said members, and means in fixed relation with said handle means slidingly engaging about the pivot interconnecting said arm members and operable to latch the convergent portions of said arm members in various of their relative positions.

HARRY J. GRIFFITH.